United States Patent
Ying

(10) Patent No.: US 6,636,141 B2
(45) Date of Patent: Oct. 21, 2003

(54) CONTROLLABLE ELECTRONIC SWITCH

(75) Inventor: Jeffrey Ying, Glendora, CA (US)

(73) Assignee: Yingco Electronic Inc., Azusa, CA (US)

( * ) Notice: Subject to any disclaimer, the term of this patent is extended or adjusted under 35 U.S.C. 154(b) by 204 days.

(21) Appl. No.: 09/903,403

(22) Filed: Jul. 10, 2001

(65) Prior Publication Data

US 2003/0011460 A1 Jan. 16, 2003

(51) Int. Cl.⁷ ..................... H01H 61/013; H01H 71/16
(52) U.S. Cl. ................... 337/102; 337/85; 337/86; 337/105; 337/107; 337/113
(58) Field of Search ............... 337/16, 14, 36, 337/85, 86, 102, 105, 107, 113, 333, 362, 377

(56) References Cited

U.S. PATENT DOCUMENTS

| | | | | |
|---|---|---|---|---|
| 2,381,784 A | * | 8/1945 | Strobel | 236/68 R |
| 2,605,339 A | * | 7/1952 | Connolly | 200/83 R |
| 3,108,166 A | * | 10/1963 | Baker et al. | 337/102 |
| 3,284,597 A | * | 11/1966 | Hollis | 337/103 |
| 3,371,175 A | * | 2/1968 | Benedik | 337/102 |
| 3,501,718 A | | 3/1970 | Chambers | 335/66 |
| 3,601,736 A | * | 8/1971 | Sepe | 337/101 |
| 3,629,762 A | | 12/1971 | Walling | 337/62 |
| 3,629,763 A | | 12/1971 | Walling | 337/66 |
| 3,660,792 A | * | 5/1972 | Strain et al. | 337/102 |
| 3,706,916 A | | 12/1972 | Halbeck et al. | 317/33 SC |
| 3,808,572 A | | 4/1974 | Gaskill | 337/106 |
| 3,863,186 A | | 1/1975 | Mallonen | 337/99 |
| 3,883,781 A | | 5/1975 | Cotton | 317/14 R |
| 3,914,722 A | | 10/1975 | Mallonen | 335/44 |
| 3,968,468 A | * | 7/1976 | Anderson | 29/622 |
| 3,983,454 A | | 9/1976 | Cotton et al. | 317/14 J |
| 4,110,719 A | | 8/1978 | Kirkup | 337/46 |
| 4,117,346 A | * | 9/1978 | Burgess | 307/117 |
| 4,165,502 A | | 8/1979 | Andersen | 335/39 |
| 4,184,633 A | | 1/1980 | Bata et al. | 236/68 R |
| 4,216,384 A | | 8/1980 | Hurley | 307/39 |
| 4,329,669 A | | 5/1982 | Krasser et al. | 335/20 |
| 4,345,233 A | * | 8/1982 | Matthies | 307/141 |
| 4,476,452 A | * | 10/1984 | D'Entremont | 337/102 |
| 4,625,190 A | | 11/1986 | Wafer et al. | 335/20 |
| 4,780,872 A | | 10/1988 | Masuda et al. | 370/92 |
| 4,788,518 A | | 11/1988 | Sako et al. | 337/49 |
| 5,381,121 A | | 1/1995 | Peter et al. | 335/20 |
| 5,870,014 A | * | 2/1999 | Nield et al. | 337/333 |
| 5,892,428 A | * | 4/1999 | Hsu | 337/318 |
| 5,892,644 A | | 4/1999 | Evans et al. | 361/19 |
| 6,075,436 A | * | 6/2000 | Hsu | 337/318 |
| 6,411,190 B1 | * | 6/2002 | Yamaguchi et al. | 180/279 |
| 2001/0015011 A1 | | 8/2001 | Glabau et al. | 29/868 |

FOREIGN PATENT DOCUMENTS

| | | | | |
|---|---|---|---|---|
| DE | 3544989 A1 | * | 7/1987 | F15C/04/00 |
| EP | 0 213 270 | | 3/1987 | H01H/71/16 |
| JP | 62193481 | | 8/1987 | H04Q/9/00 |
| JP | 1-140532 | | 6/1989 | H01H/73/38 |
| JP | 8-161995 | | 6/1996 | H01H/73/06 |
| JP | 1-1162312 | | 6/1999 | H01H/37/60 |

* cited by examiner

Primary Examiner—Anatoly Vortman
(74) Attorney, Agent, or Firm—Irell & Manella LLP

(57) ABSTRACT

A controllable electronic switch for, e.g., controlling power distribution comprises a bimetal member anchored at one end and in controllable contact with an electrical conductor at the other end. An incoming power wire is connected to the bimetal member near the contact point with the electrical conductor. A heating element, such as a coil, is coupled to the bimetal member, and is controlled by a switch control signal. When the switch control signal is not asserted, the heating element is inactive, and power is delivered through the incoming power wire across the end of the bimetal member to the electrical conductor, from which it can be further distributed to the load. When the switch control signal is asserted, the heating element heats up causing the bimetal to bend until the contact with the electrical conductor is broken. The electrical path from the incoming power wire to the electrical conductor (and hence, to the load) is then broken. So long as the switch control signal is asserted, the heating element continues to keep the bimetal bent and the electrical path broken.

39 Claims, 3 Drawing Sheets

CONTROLLABLE ELECTRONIC SWITCH

BACKGROUND OF THE INVENTION

1. Field of the Invention

The field of the invention generally pertains to electronic switches and, more specifically, to controllable electronic switches for controlling power distribution.

2. Background

Power switches have been used for many years to connect and disconnect power sources to loads. A common type of power switch is a circuit breaker, which generally provides a function of preventing an excessive amount of current from being drawn from the power source or into the load, by breaking the electrical circuit path between the source and load when the current limit is reached. A typical circuit breaker has a bimetal arm through which travels a power signal from the source to the load. One end of the bimetal arm is connected to the power signal line, while the other end of the bimetal arm is connected to an electrical conductor from which the power can be distributed to the load. When too much current travels through the bimetal arm, the heat from the current causes the bimetal arm to deform or bend in a predictable manner, which causes the bimetal arm to break contact with the electrical conductor, resulting in a break between the power signal and the load. In this manner, the source and load are both protected from currents which exceed a certain limit.

While circuit breakers are useful for protecting against high current levels, they are generally passive circuit elements whose response depends entirely upon the amount of power being drawn by the load. They typically do not provide active control of a power signal line. However, some resettable circuit breakers have been proposed, which utilize, for example, a spring-operated mechanism allowing a remote operator to open and close the contacts of the circuit breaker. An example of such a circuit breaker is disclosed in U.S. Pat. No. 3,883,781 issued to J. Cotton.

Other types of remotely controlled or operated circuit breakers are described, for example, in U.S. Pat. No. 5,381,121 to Peter et al., and U.S. Pat. No. 4,625,190 to Wafer et al. These circuit breakers involve rather elaborate mechanisms that, due to their complexity, would be expensive to manufacture and potentially subject to mechanical wear or failure.

Besides circuit breakers, other types of circuits have been utilized in controlling power signals. However, these other types of circuits have drawbacks as well. For example, solid state switches (e.g., transistors or silicon-controlled rectifiers (SCRs)) can be used as switches between a power source and load, for controlling distribution of the power signal to the load. However, transistors and SCRs generally have limited power ratings and, at high current levels, can become damaged or shorted. Moreover, transistors or SCRs with high power ratings can be relatively expensive.

It would therefore be advantageous to provide a controllable electronic switch capable of selectively connecting or disconnecting a power source to a load. It would further be advantageous to provide such a switch that is reliable, durable, and low-cost, and that can handle relatively high power demands, such as may be required for residential or commercial applications.

SUMMARY OF THE INVENTION

The invention in one aspect is generally directed to a controllable electronic switch for controlling power distribution.

In one embodiment, a controllable electronic switch comprises a deformable member (e.g., a bimetal member or arm) anchored at one end and in controllable contact with an electrical conductor at the other end. An incoming power wire is connected to the bimetal member near the contact point with the electrical conductor. A heating element (such as a coil) is coupled to the bimetal member, and is controlled by a switch control signal. When the switch control signal is not asserted, the heating element is inactive, and power is delivered through the incoming power wire across the end of the bimetal member to the electrical conductor, from which it can be further distributed to the load. When the switch control signal is asserted, the heating element heats up causing the bimetal to bend until the contact with the electrical conductor is broken. The electrical path from the incoming power wire to the electrical conductor (and hence, to the load) is then broken. So long as the switch control signal is asserted, the heating element continues to keep the bimetal bent and the electrical path broken.

Further embodiments, variations and enhancements are also disclosed herein.

BRIEF DESCRIPTION OF THE DRAWINGS

FIG. 2-1 is a diagram illustrating an example of the flow of electricity when the circuit breaker of FIG. 1 is closed (normal operation), and FIG. 2-2 is a diagram illustrating an example of how the bimetal of the circuit breaker breaks the circuit connection when an over-current situation occurs.

FIG. 4-1 is a diagram illustrating an example of the flow of electricity when the electronic switch of FIG. 3 is closed, and FIG. 4-2 is a diagram illustrating how the bimetal of the electronic switch of FIG. 3 breaks the circuit connection in response to assertion of a control signal.

DETAILED DESCRIPTION OF PREFERRED EMBODIMENTS

Figure 1:
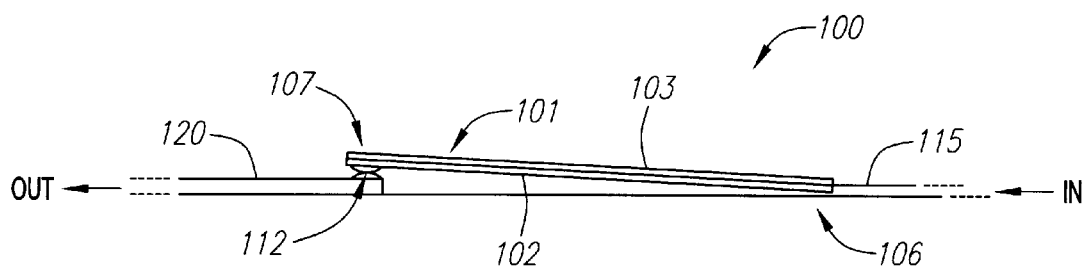
FIG. 1 is a conceptual diagram of a bimetal-based circuit breaker as known in the art.

FIG. 1 is a conceptual diagram of a bimetal-based circuit breaker 100 as known in the art. As illustrated in FIG. 1, the circuit breaker 100 comprises a bimetal arm 101 which is formed of two metallic layers 102, 103. The bimetal arm 101 is anchored at one end 106, and connects at that end 106 to an incoming power signal line 115. At its other end 107, the bimetal arm 101 resides in electrical contact with an electrical conductor 120. The electrical conductor 120 may be connected to a load (not shown) and, in normal operation (i.e., normal current flow), power from the power signal line 115 is conducted through the bimetal arm 101 and the electrical conductor 120 to the load.

The metallic substances of the different metallic layers 102, 103 of the bimetal arm 101 are selected to have different thermal properties such that they heat at different rates. In particular, the metallic substance of the lower metallic layer 102 heats faster than the metallic substance of the upper metallic layer 103. When the amount of current traveling through the bimetal arm 101 is within "normal" limits, the amount of heating caused by the current passing through the bimetal arm 101 (which has a natural resistivity) is small and the bimetal arm 101 does not deform. However, when the amount of current traveling through the bimetal arm 101 exceeds an over-current limit (which is determined largely by the relative thermal properties of the metallic substances used in the metallic layers 102 and 103), the lower metallic layer 102 heats more rapidly than the upper metallic layer 103 and causes the bimetal arm 101 to bend, thus breaking the electrical circuit path between the incoming power signal line 115 and the electrical conductor 120.

Figures 1, 2:
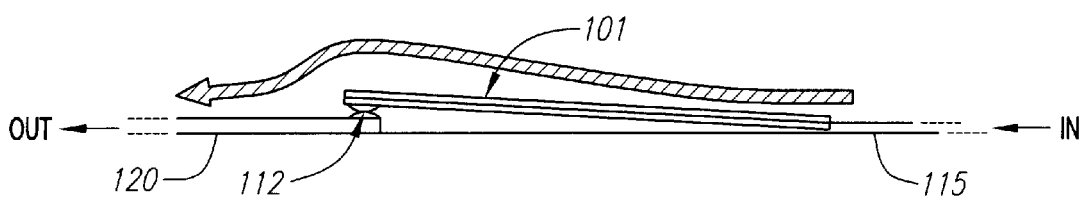
Figure 2:
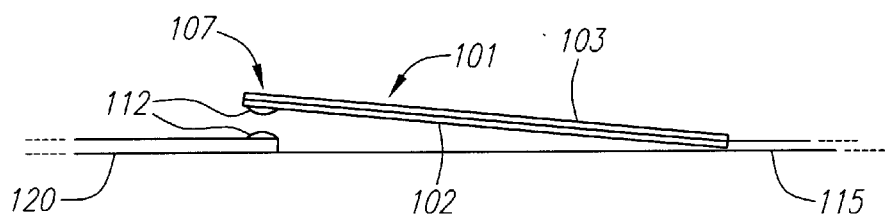

This operation can be illustrated by the diagrams of FIGS. 2-1 and 2-2. FIG. 2-1 is a diagram illustrating an example of the flow of electricity when the circuit breaker 100 of FIG. 1 is closed (normal operation), and FIG. 2—2 is a diagram illustrating an example of how the bimetal arm 101 of the circuit breaker 100 breaks the circuit connection when an over-current situation occurs. As shown in FIG. 2-1, a power signal travels through incoming power wire 115 (marked "IN") through the bimetal arm 101 and across contacts 112, to the electrical conductor 120 (marked "OUT"). So long as the amount of current in the power signal is below the over-current limit, the amount of heating caused by the current passing through the bimetal arm 101 is small, and the bimetal arm 101 does not deform. However, as now shown in FIG. 2-2, when the amount of current traveling through the bimetal arm 101 exceeds the over-current limit, the current heats the bimetal arm 101, but the lower metallic layer 102 heats more rapidly than the upper metallic layer 103 thus causing the bimetal arm 101 to bend. As a result, the contacts 112 gradually separate, breaking the electrical circuit path between the incoming power signal line 115 and the electrical conductor 120. The amount of current needed to cause the circuit breaker 100 to "trip" depends upon the relative thermal properties of the two metallic layers 102, 103 of the bimetal arm 101.

After being tripped, gradually the bimetal arm 101 of the circuit breaker 100 will cool, until eventually the bimetal arm 101 is no longer deformed. As this occurs, the contacts 112 once again form an electrical connection, allowing the power signal to pass from the incoming power wire 115 to the electrical conductor 120.

Figure 3:
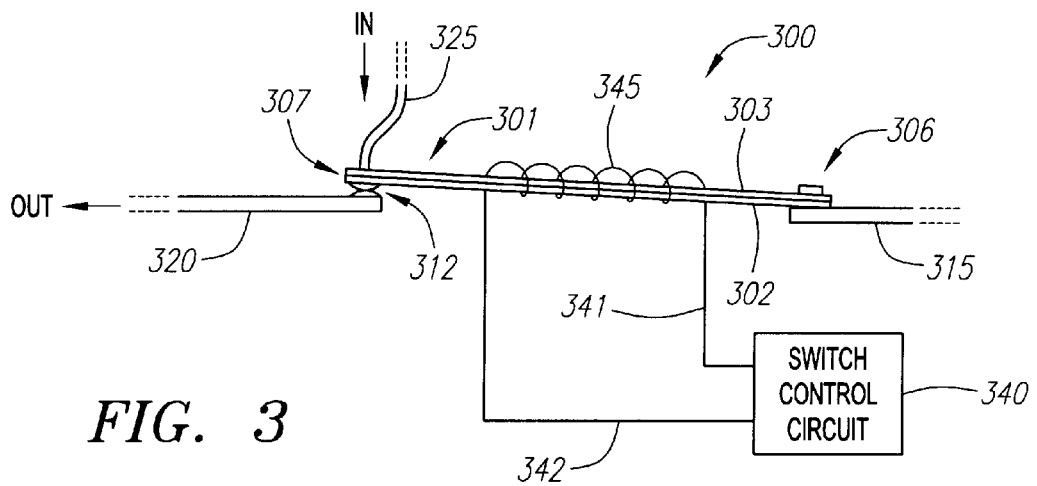
FIG. 3 is a diagram of a controllable electronic switch in accordance with one embodiment as disclosed herein.

FIG. 3 is a diagram of a controllable electronic switch 300 in accordance with one embodiment as disclosed herein. As shown in FIG. 3, the controllable electronic switch 300 comprises a deformable member 301 which may be formed in the general shape of an arm (similar to that shown in FIG. 1) and may be comprised of two layers 302, 303 having different thermal properties. Preferably, the two layers 302, 303 are metallic in nature, although any durable substance that bends when heated can be used. As further shown in FIG. 3, the deformable member 301 is preferably anchored at one end 306 to a non-conductive surface 315. At its other end, the deformable member 301 preferably resides in contact with an electrical conductor 320 through contacts 312. An incoming power wire 325 is connected to the deformable member 301 preferably near the contact point with the electrical conductor 320, so as to minimize any power dissipation caused by the current running through the deformable member 301, and also so as to avoid heating the deformable member 301 to any significant degree regardless of the current being drawn. The electrical conductor 320 may be connected to a load (not shown) and, in normal operation (that is, in the absence of assertion of a switch control signal, as explained below), power from the power signal line 325 is conducted through the deformable member 301 and the electrical conductor 320 to the load.

The metallic substances of the different metallic layers 302, 303 of the deformable member 301 are preferably selected to have different thermal properties such that they heat at different rates. In particular, the metallic substance of the lower metallic layer 302 preferably heats faster than the metallic substance of the upper metallic layer 303. When heat is applied to the deformable member 301, the faster heating of the lower metallic layer 302 as compared to the upper metallic layer 303 causes the deformable member 301 to bend, similar to a circuit breaker 100, thus breaking the electrical circuit path between the incoming power signal line 325 and the electrical conductor 320.

Figures 1, 4:
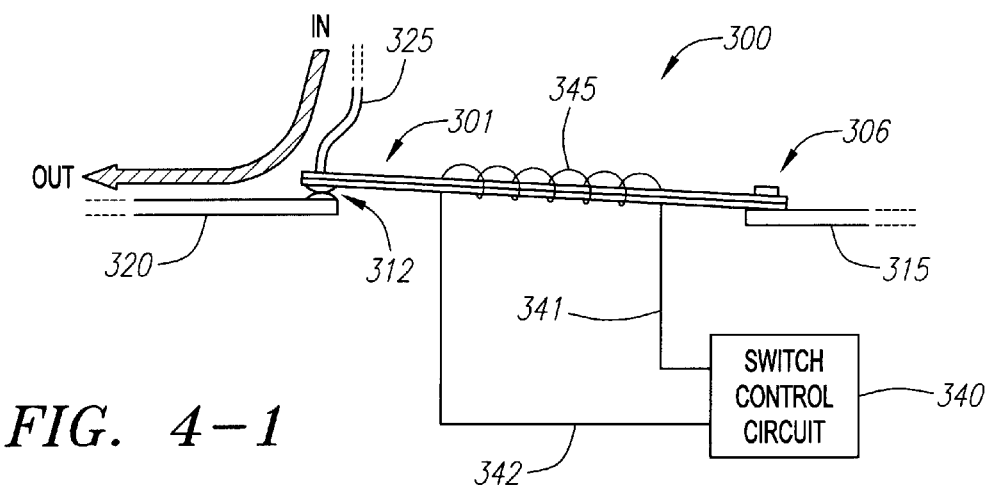
Figures 2, 4:
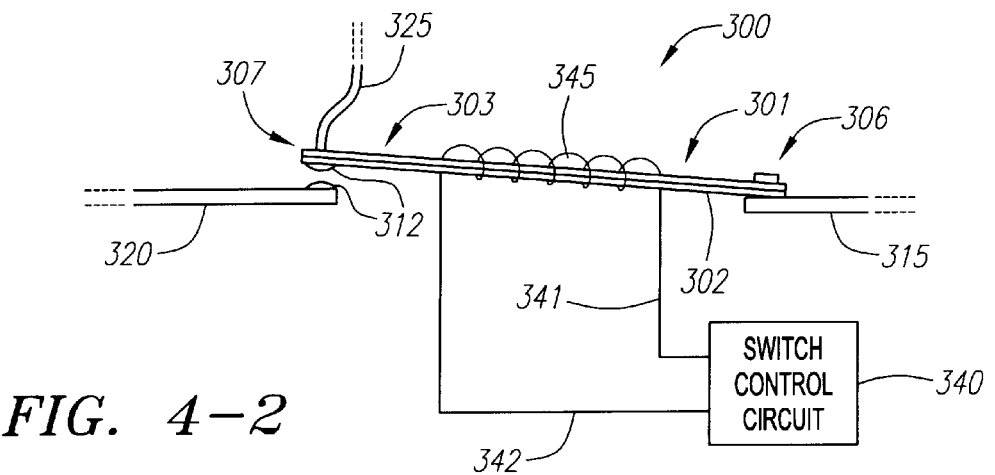

As further illustrated now in FIG. 3, a heating element 345 (such as a resistive coil) is coupled (e.g., wrapped around, in the case of a resistive coil) to the deformable member 301. The heating element 345 is preferably controlled by a switch control circuit 340 connected thereto by a pair of signal lines 341, 342. When the switch control signal output from the switch control circuit 340 is not asserted, the heating element 345 is effectively disconnected (and thus inactive), and power is delivered through the incoming power wire 325 across the end 307 of the deformable member 301, via contacts 312, to the electrical conductor 320, from which it can be further distributed to the load. This operation is illustrated in FIG. 4-1. When, however, the switch control signal from the switch control circuit 340 is asserted, the heating element 345 heats up due to the effect of the current flowing through the heating element 345. Since the lower metallic layer 302 heats more rapidly than the upper metallic layer 303, the deformable member 301 starts to bend bends. Eventually, as a result of this bending, the contacts 312 gradually separate, breaking the electrical circuit path between the incoming power signal line 325 and the electrical conductor 320, as illustrated in FIG. 4-2.

So long as the switch control signal from the switch control circuit 340 is asserted, the heating element 345 continues to keep the deformable member 301 bent and the electrical path between the incoming power wire 325 and the electrical conductor 320 disconnected. Once the switch control signal from the switch control circuit 340 is de-asserted, the deformable member 301 gradually cools, until eventually the deformable member 301 is no longer deformed. As this occurs, the contacts 312 once again form an electrical connection, allowing the power signal to pass from the incoming power wire 325 to the electrical conductor 320 and then to the load.

In one aspect, the controllable electronic switch 300 illustrated in FIG. 3 can provide a convenient, inexpensive mechanism for controlling the distribution of power from a source to a load. Moreover, the controllable electronic switch 300 need not consume any power when the deformable member 301 is in a closed position, and only requires minimal power to cause the deformable member 301 to open.

The incoming power wire 325 may be connected to the deformable member 301 in any of a variety of manners. The incoming power wire 325 may, for example, simply be welded, spliced or soldered to the moving end 307 of the deformable member 301. Any form of attaching the incoming power wire 325 to the deformable member 301 will suffice so long as electricity conducts between the incoming power wire 325 and the electrical conductor 320 when the deformable member 301 is in a switch-closed position.

Figure 5:
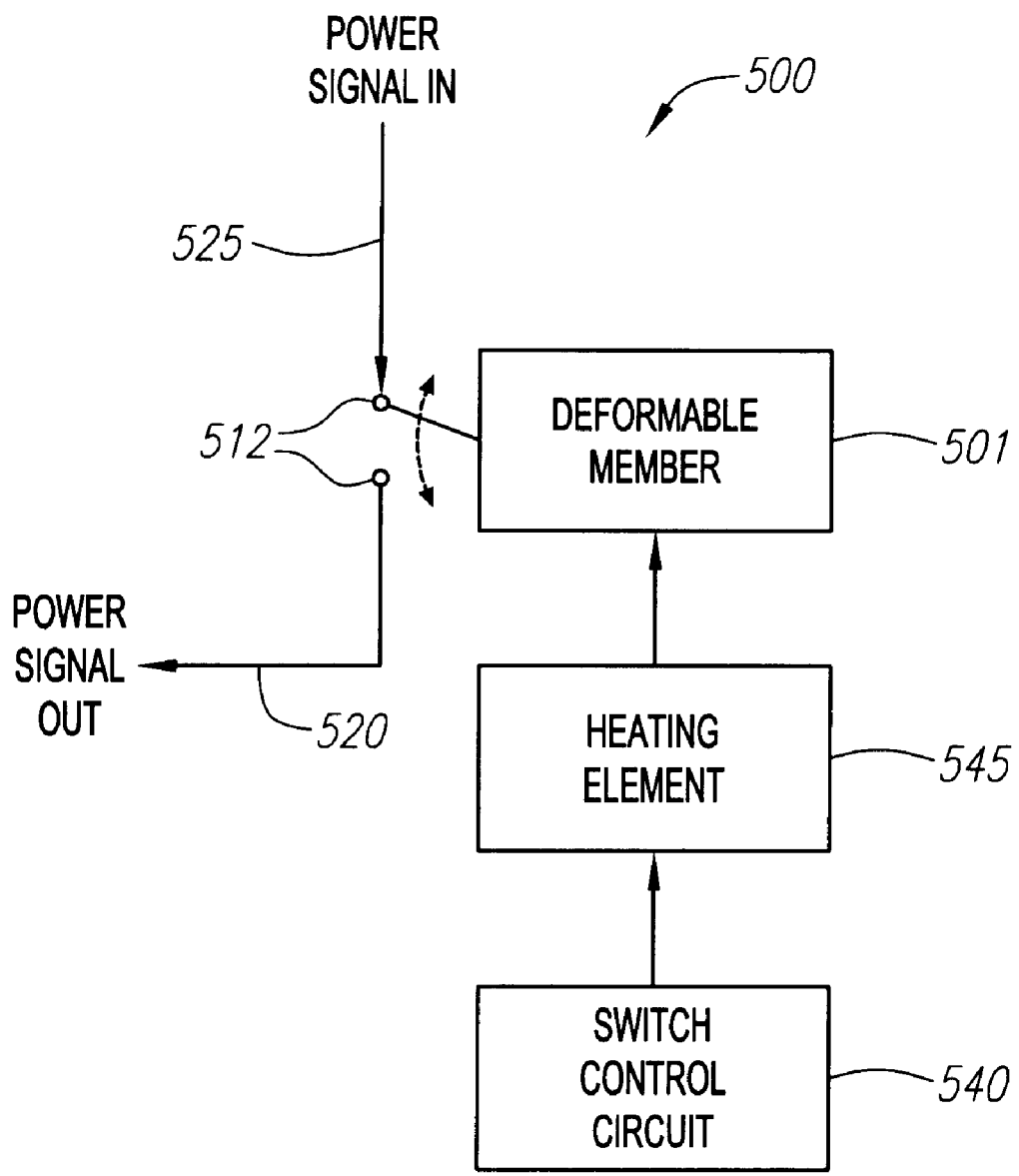
FIG. 5 is a block diagram illustrating another embodiment of a controllable electronic switch.

FIG. 5 is a block diagram illustrating a more general embodiment of a controllable electronic switch 500. As illustrated in FIG. 5, the controllable electronic switch 500 comprises a deformable member 501 which controllably connects an incoming power wire 525 to an electrical conductor 520. A heating element 545 is coupled to the deformable member 501, and is controlled by a switch control circuit 540. The deformable member 501, which may take the form of, e.g., a bimetal member or arm, preferably allows the incoming power wire 525 to conduct a power signal to the electrical conductor 520 when the deformable member 501 is not being heated by the heating element 545, but preferably causes the connection between the incoming power wire 525 to the electrical conductor 520 to be physically broken when then deformable member 501 is heated by the heating element 545. The heating element 545 may comprise, e.g., a resistive coil or other resistor, and, if a resistive coil, may be conveniently wound around the deformable member 501 if embodied as a bimetal member or arm.

In either of the embodiments illustrated in FIGS. 3 and 5, the deformable member 301 or 501 need not be uniformly straight and, in fact, can be any shape so long as, when heated, it bends in a predictable manner so as to break the electrical connection between the incoming power wire 325 or 525 and the electrical conductor 320 or 520. Moreover, although the deformable member 301 or 501 is described in a preferred embodiment as a bimetal arm having two metallic layers, it alternatively could be made out of any other material (metallic or otherwise) that bends in a predictable manner. Because no current needs to travel from one end of the deformable member 301 or 501 to the other end (unlike a circuit breaker), the deformable member 301 or 501 may, if desired, have non-conductive or insulating portions separating the various areas of the deformable member 301 or 501 from one another. For example, a non-conductive portion (e.g., plastic) could be placed between the area of the deformable member 301 or 501 coupled to the heating element 345 or 545 and either end of the deformable member 301 or 501 (e.g., either end 306 and/or 307 of the deformable member 301 in the example of FIG. 3). Further, the end of the deformable member 301 through which power is conducted (e.g., end 307 in FIG. 3) need not be bimetal, but could be a uniform conductive material (e.g., a single metal). Alternatively, the deformable member 301 or 501 could have additional (i.e., more than two) layers. The primary quality of the deformable member 301 or 501 is that it bends or otherwise deforms sufficiently when heated so as to break the electrical connection of the path of the power signal (e.g., by separating contacts 312 in the example of FIG. 3).

The switch control signal output from the switch control circuit 340 or 540 to the heating element 345 or 545 is preferably a direct current (DC) signal, but could also be an alternating current (AC) signal or hybrid signal. When the switch control signal is not asserted, the switch control circuit 340 may simply short the heating element 345 or 545 (e.g., by shorting wires 341, 342 in the example of FIG. 3), or else simply isolate the heating element 345 or 545 through a buffer or other isolation circuit.

While the heating elements 345 and 545 in FIGS. 3 and 5 have been described in preferred embodiments as a resistive coil, the heating element 345 or 545 could take other forms or configurations. For example, if embodied as a resistive coil, the heating element 345 or 545 need not be wound around the deformable member 301 or 501. The heating element 345 or 545 could be a different type of resistor besides a resistive coil. However, a resistive coil is preferred as the heating element 345 or 545 because it provides relatively even heating over a given area, and is relatively simple to implement and is relatively inexpensive.

The speed of response of the deformable member 301 or 501 to the swtich control circuit 340 or 540 may or may not be critical, depending upon the particular application. If the speed of response is not very critical, then the switch control signal can be a very low power signal. If faster response time is desired, the switch control signal can be increased in power, thus causing more rapid heating of the heating element 345 or 545. The switch control circuit 340 or 540 may be provided with its own power source (e.g., a battery), or else it may obtain power from the incoming power wire 325 or 525 or some other available source. The switch control circuit 340 or 540 may be activated by a manual switch (not shown) which causes assertion of the switch control signal and, therefore, eventual opening of the controllable electronic switch 300 or 500, or else may be activated by a remote electronic signal.

It is therefore apparent that various embodiments as disclosed herein provide a simple, effective, reliable and inexpensive controllable electronic switch capable of controlling the distribution of power signals (either low voltage and/or current or high voltage and/or current) from a power signal source to a load. Moreover, the controllable electronic switch need not consume any power when the switch is closed, and takes only minimal power to open and maintain open. Certain embodiments can allow remote operation of the controllable electronic switch, thus providing a flexible and convenient mechanism to control power distribution.

While preferred embodiments of the invention have been described herein, many variations are possible which remain within the concept and scope of the invention. Such variations would become clear to one of ordinary skill in the art after inspection of the specification and the drawings. The invention therefore is not to be restricted except within the spirit and scope of any appended claims.

What is claimed is:

1. A controllable electronic switch, comprising:
   a bimetal member having a first end and a second end, said bimetal member anchored at said first end and residing in contact with an electrical conductor at said second end;
   an incoming power wire connected to the bimetal member at said second end near the electrical conductor, said incoming power wire being electrically connected to said electrical conductor when the bimetal member resides in contact with the electrical conductor;
   a heating element coupled to the bimetal member; and
   a switch control circuit connected to said heating element, whereby said heating element is caused to heat to a point sufficient to bend said bimetal member so as to break contact between the second end of the bimetal member and the electrical conductor when said switch control circuit asserts a switch control signal.

2. The controllable electronic switch of claim 1, wherein the second end of said bimetal member remains in contact with the electrical conductor when said switch control signal has not been asserted.

3. The controllable electronic switch of claim 2, wherein power is conveyed from the incoming power wire to a remote load through the electrical conductor when the second end of said bimetal member is in contact with the electrical conductor, and no power is conveyed to the remote load when the second end of said bimetal member has broken contact with the electrical conductor.

4. The controllable electronic switch of claim 1, wherein said heating element comprises a resistive coil.

5. The controllable electronic switch of claim 1, wherein manual activation of said switch control circuit causes said switch control signal to be asserted.

6. The controllable electronic switch of claim 1, wherein said switch control signal is asserted by said switch control circuit in response to an electronic command signal received from a remote source.

7. The controllable electronic switch of claim 1, wherein said incoming power wire is welded to said second end of said bimetal member.

8. The controllable electronic switch of claim 7, wherein said second end of said bimetal member has a top side comprised of a first metallic substance and a bottom side comprised of a second metallic substance, wherein said incoming power wire is welded to the top side of said second end of said bimetal member, and wherein the bottom side of said second end of said bimetal member resides in contact with the electrical conductor when the switch control signal is not asserted.

9. A controllable electronic switch, comprising:
   a bimetal arm having a first end and a second end, said bimetal arm anchored at said first end and residing in contact with an electrical conductor at said second end when said bimetal arm is in an ambient state;

an incoming power wire connected to the bimetal arm at or near said second end near the electrical conductor, such that a power signal through said incoming power wire has an electrical path through the electrical conductor to a remote load when the bimetal arm resides in contact with the electrical conductor;

a heating element coupled to the bimetal arm; and a switch control circuit connected to said heating element for controlling the opening of said bimetal arm, whereby said heating element is caused to heat to a point sufficient to bend said bimetal arm so as to break contact between the second end of the bimetal member and the electrical conductor when said switch control circuit asserts a switch control signal, thereby breaking the electrical path between the power signal and a remote load.

10. The controllable electronic switch of claim 9, wherein the second end of said bimetal arm remains in contact with the electrical conductor when said switch control signal has not been asserted.

11. The controllable electronic switch of claim 9, wherein said heating element comprises a resistive coil.

12. The controllable electronic switch of claim 11, wherein said resistive coil is wound around said bimetal arm.

13. The controllable electronic switch of claim 9, wherein manual activation of said switch control circuit causes said switch control signal to be asserted.

14. The controllable electronic switch of claim 9, wherein said switch control signal is asserted by said switch control circuit in response to an electronic command signal received from a remote source.

15. The controllable electronic switch of claim 9, wherein said incoming power wire is welded to said second end of said bimetal arm.

16. The controllable electronic switch of claim 15, wherein said second end of said bimetal arm has a top side comprised of a first metallic substance and a bottom side comprised of a second metallic substance, wherein said incoming power wire is welded to the top side of said second end of said bimetal arm, and wherein the bottom side of said second end of said bimetal arm resides in contact with the electrical conductor when the switch control signal is not asserted.

17. A method of controlling power delivery, comprising the steps of:

anchoring a first end of a bimetal arm;

positioning the bimetal arm such that a second end thereof resides in contact with an electrical conductor when the bimetal arm is in an ambient state and bends away from the electrical conductor when the bimetal arm is heated;

connecting an incoming power wire to the bimetal arm at the second end thereof near the electrical conductor, such that a power signal through said incoming power wire has an electrical path through the electrical conductor to a remote load when the bimetal arm resides in contact with the electrical conductor;

coupling a heating element to the bimetal arm;

connecting a switch control signal to said heating element; and selectively applying and removing said switch control signal to control heating of said heating element and thereby opening and closing of said bimetal arm.

18. The method of claim 17, wherein applying said switch control signal causes heating of said heating element and, consequently, of said bimetal arm such that said bimetal arm bends away from the electrical conductor, and wherein removing said switch control signal causes said heating element to cool and, consequently, cooling of said bimetal arm such that it resumes contact with the electrical conductor.

19. The method of claim 17, wherein said step of coupling a heating element to the bimetal arm comprises the step of winding a resistive coil around said bimetal arm.

20. The method of claim 17, wherein said step of selectively applying and removing said switch control signal to control heating of said heating element comprises the step of manually activating and deactivating a switch control circuit which in turn applies and removes said switch control signal.

21. The method of claim 17, wherein said step of selectively applying and removing said switch control signal to control heating of said heating element comprises the step of receiving an electronic command signal from a remote source and applying and removing said switch control signal in response thereto.

22. The method of claim 17, wherein said step of connecting an incoming power wire to the bimetal arm at the second end thereof near the electrical conductor comprises the step of welding said incoming power wire to said second end of said bimetal arm.

23. The method of claim 22, wherein said second end of said bimetal arm has a top side comprised of a first metallic substance and a bottom side comprised of a second metallic substance, and wherein said step of welding said incoming power wire to said second end of said bimetal arm further comprises the step of welding said incoming power wire to the top side of said second end of said bimetal arm, the bottom side of said second end of said bimetal member residing in contact with the electrical conductor when the switch control signal is not applied.

24. A controllable electronic switch, comprising:

a deformable member having a first end and a second end, said deformable member anchored at said first end and residing in contact with an electrical conductor at said second end;

an incoming power wire connected to the deformable member at said second end near the electrical conductor, said incoming power wire being electrically connected to said electrical conductor when the deformable member resides in contact with the electrical conductor;

a heating element in proximity with the deformable member; and a switch control circuit connected to said heating element.

25. The controllable electronic switch of claim 24, wherein said switch control circuit outputs a switch control signal, wherein assertion of said switch control signal by said switch control circuit forces a current through said heating element causing said heating element to heat, thereby bending said deformable member so as to break contact between the second end of the deformable member and the electrical conductor, and wherein non-assertion of said switch control signal by said switch control circuit causes said heating element to remain unheated thereby allowing said deformable member to remain unbent and in contact with the electrical conductor.

26. The controllable electronic switch of claim 24, wherein said heating element comprises a resistive coil.

27. The controllable electronic switch of claim 24, wherein said switch control circuit is manually activated.

28. The controllable electronic switch of claim 24, wherein said switch control circuit is activated by an electronic command signal received from a remote source.

29. The controllable electronic switch of claim 24, wherein said incoming power wire is welded to said second end of said deformable member.

30. The controllable electronic switch of claim 24, wherein said deformable member comprises a bimetal member.

31. The controllable electronic switch of claim 30, wherein said second end of said bimetal member has a top side comprised of a first metallic substance and a bottom side comprised of a second metallic substance, wherein said incoming power wire is welded to the top side of said second end of said bimetal member, and wherein the bottom side of said second end of said bimetal member resides in contact with the electrical conductor when the switch control circuit is not activated.

32. A controllable electronic switch, comprising:
- a deformable member having a first end and a second end, said deformable member anchored at said first end and residing in contact with an electrical conductor at said second end;
- an incoming power wire connected to the deformable member at said second end near the electrical conductor, said incoming power wire being electrically connected to said electrical conductor when the deformable member resides in contact with the electrical conductor;
- a heating element in proximity with the deformable member; and
- a signal wire connected to said heating element, said signal wire conveying a switch control signal to said heating element.

33. The controllable electronic switch of claim 32, wherein assertion of said switch control signal forces a current through said heating element causing said heating element to heat, thereby bending said deformable member so as to break contact between the second end of the deformable member and the electrical conductor, and wherein non-assertion of said switch control signal causes said heating element to remain unheated thereby allowing said deformable member to remain unbent and in contact with the electrical conductor.

34. The controllable electronic switch of claim 32, wherein said heating element comprises a resistive coil.

35. The controllable electronic switch of claim 32, further comprising a switch control circuit outputting said switch control signal, wherein said switch control signal is asserted by manual activation of said switch control circuit.

36. The controllable electronic switch of claim 32, further comprising a switch control circuit outputting said switch control signal, wherein said switch control signal is asserted in response to an electronic command signal received from a remote source.

37. The controllable electronic switch of claim 32, wherein said incoming power wire is welded to said second end of said deformable member.

38. The controllable electronic switch of claim 32, wherein said deformable member comprises a bimetal member.

39. The controllable electronic switch of claim 38, wherein said second end of said bimetal member has a top side comprised of a first metallic substance and a bottom side comprised of a second metallic substance, wherein said incoming power wire is welded to the top side of said second end of said bimetal member, and wherein the bottom side of said second end of said bimetal member resides in contact with the electrical conductor when the switch control signal is not asserted.

* * * * *